(12) United States Patent
Clark et al.

(10) Patent No.: US 11,255,208 B2
(45) Date of Patent: Feb. 22, 2022

(54) FEATHER SEAL FOR CMC BOAS

(71) Applicant: United Technologies Corporation, Farmington, CT (US)

(72) Inventors: Thomas E. Clark, Sanford, ME (US); William M. Barker, North Andover, MA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 37 days.

(21) Appl. No.: 16/413,197

(22) Filed: May 15, 2019

(65) Prior Publication Data

US 2020/0362718 A1 Nov. 19, 2020

(51) Int. Cl.
| | |
|---|---|
| *F01D 11/08* | (2006.01) |
| *F02C 3/04* | (2006.01) |
| *F02C 7/28* | (2006.01) |
| *F16J 15/34* | (2006.01) |

(52) U.S. Cl.
CPC ............... *F01D 11/08* (2013.01); *F02C 3/04* (2013.01); *F02C 7/28* (2013.01); *F16J 15/3496* (2013.01); *F05D 2220/32* (2013.01); *F05D 2240/35* (2013.01); *F05D 2240/55* (2013.01); *F05D 2300/6033* (2013.01)

(58) Field of Classification Search
CPC ........... F01D 11/08; F01D 11/005; F02C 7/28
See application file for complete search history.

(56) References Cited

U.S. PATENT DOCUMENTS

| | | | |
|---|---|---|---|
| 3,064,717 A | 11/1962 | Morrealle et al. | |
| 3,970,318 A * | 7/1976 | Tuley | F01D 11/005 277/641 |
| 5,154,577 A * | 10/1992 | Kellock | F01D 11/005 277/641 |
| 5,374,161 A * | 12/1994 | Kelch | F01D 11/005 415/139 |
| 5,609,469 A | 3/1997 | Worley et al. | |

(Continued)

FOREIGN PATENT DOCUMENTS

| | | |
|---|---|---|
| EP | 3064717 | 9/2016 |
| EP | 3219922 | 9/2017 |

(Continued)

OTHER PUBLICATIONS

Extended European Search Report for EP Application No. 20174505.6 dated Jul. 31, 2020.

*Primary Examiner* — Michael L Sehn
(74) *Attorney, Agent, or Firm* — Carlson, Gaskey & Olds, P.C.

(57) ABSTRACT

A blade outer air seal assembly includes a support structure. A blade outer air seal has a plurality of segments that extends circumferentially about an axis and is mounted in the support structure. At least two of the segments have a base portion that extends from a first circumferential side to a second circumferential side. A first protrusion extends from the first circumferential side and has a first radially extending slot. A second protrusion extends from a second circumferential side and has a second radially extending slot. A feather seal is arranged in the first radially extending slot and the second radially extending slot between at least two segments.

18 Claims, 4 Drawing Sheets

(56) References Cited

U.S. PATENT DOCUMENTS

| | | | | |
|---|---|---|---|---|
| 5,716,052 | A * | 2/1998 | Swensen | F16J 15/0887 |
| | | | | 277/608 |
| 6,431,825 | B1 * | 8/2002 | McLean | F01D 11/005 |
| | | | | 277/644 |
| 6,808,363 | B2 * | 10/2004 | Darkins, Jr. | F01D 11/005 |
| | | | | 277/630 |
| 6,857,848 | B2 * | 2/2005 | Fokine | F01D 11/005 |
| | | | | 415/116 |
| 8,206,092 | B2 | 6/2012 | Tholen et al. | |
| 8,585,354 | B1 | 11/2013 | Liang | |
| 10,196,918 | B2 | 2/2019 | McCaffrey | |
| 2005/0023752 | A1 | 10/2005 | Meisels | |
| 2014/0271142 | A1 * | 9/2014 | Albers | F01D 11/122 |
| | | | | 415/173.1 |
| 2015/0377035 | A1 | 12/2015 | Freeman et al. | |
| 2016/0194974 | A1 * | 7/2016 | Blaney | F01D 25/28 |
| | | | | 415/173.1 |
| 2016/0319686 | A1 * | 11/2016 | Shi | F01D 11/005 |
| 2017/0306781 | A1 * | 10/2017 | Lewis | F01D 11/08 |
| 2018/0195403 | A1 * | 7/2018 | Kerns | F04D 29/526 |
| 2018/0347402 | A1 | 12/2018 | Boeck | |
| 2020/0132303 | A1 * | 4/2020 | Prociw | F23R 3/50 |

FOREIGN PATENT DOCUMENTS

| | | |
|---|---|---|
| EP | 3269937 | 1/2018 |
| EP | 3327254 | 5/2018 |

* cited by examiner

FEATHER SEAL FOR CMC BOAS

BACKGROUND

This application relates to a ceramic matrix composite component assembly, such as a blade outer air seal assembly.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades. Blade outer air seals have been proposed made of ceramic matrix composite fiber layers.

SUMMARY

In one exemplary embodiment, a blade outer air seal assembly includes a support structure. A blade outer air seal has a plurality of segments that extends circumferentially about an axis and is mounted in the support structure. At least two of the segments have a base portion that extends from a first circumferential side to a second circumferential side. A first protrusion extends from the first circumferential side and has a first radially extending slot. A second protrusion extends from a second circumferential side and has a second radially extending slot. A feather seal is arranged in the first radially extending slot and the second radially extending slot between at least two segments.

In a further embodiment of the above, at least one segment has at least one hook extending radially outward from the base portion. The first and second radially extending slots are circumferentially outward of at least one hook.

In a further embodiment of any of the above, the feather seal has a thickness that is less than a circumferential width of the first and second radially extending slots.

In a further embodiment of any of the above, a ratio of the circumferential width of the first and second radially extending slots to the thickness of the feather seal is between about 1.5 and 2.5.

In a further embodiment of any of the above, the feather seal has a thickness and a rounded end that has a greater thickness at a radially inner end.

In a further embodiment of any of the above, the feather seal is configured to rotate about the rounded end.

In a further embodiment of any of the above, the feather seal is configured to rotate less than about 10°.

In a further embodiment of any of the above, the thickness is about 0.010 to 0.030 inches (0.254-0.762 mm).

In a further embodiment of any of the above, the base portion extends from a first axial side to a second axial side to define a seal segment axial length. The feather seal extends in an axial direction for most of the seal segment axial length.

In a further embodiment of any of the above, the feather seal extends in the axial direction for at least about 80% of the seal segment axial length.

In a further embodiment of any of the above, he first and second protrusions are offset in a radial direction and overlap one another in a circumferential direction.

In a further embodiment of any of the above, a gap is arranged between each of the plurality of seal segments to accommodate thermal expansion. The gap is less than about 0.040 inches (0.254-1.016 mm).

In a further embodiment of any of the above, at least two seal segments are a ceramic matrix composite material.

In a further embodiment of any of the above, at least two seal segments are a monolithic ceramic material.

In a further embodiment of any of the above, the feather seal is a ceramic matrix composite material.

In a further embodiment of any of the above, the feather seal is a metallic material.

In another exemplary embodiment, a gas turbine engine includes a compressor section, a combustor section, and a turbine section arranged about an axis of rotation. An assembly has a plurality of segments arranged circumferentially about the axis of rotation. At least two of the segments have a base portion extending from a first circumferential side to a second circumferential side. A first protrusion extends from the first circumferential side and has a first radially extending slot. A second protrusion extends from a second circumferential side and has a second radially extending slot. A feather seal is arranged in the first radially extending slot and the second radially extending slot between the at least two segments.

In a further embodiment of any of the above, at least two segments are a ceramic material.

In a further embodiment of any of the above, the feather seal is ceramic material.

In a further embodiment of any of the above, the feather seal is a metallic material.

DETAILED DESCRIPTION

Figure 1:
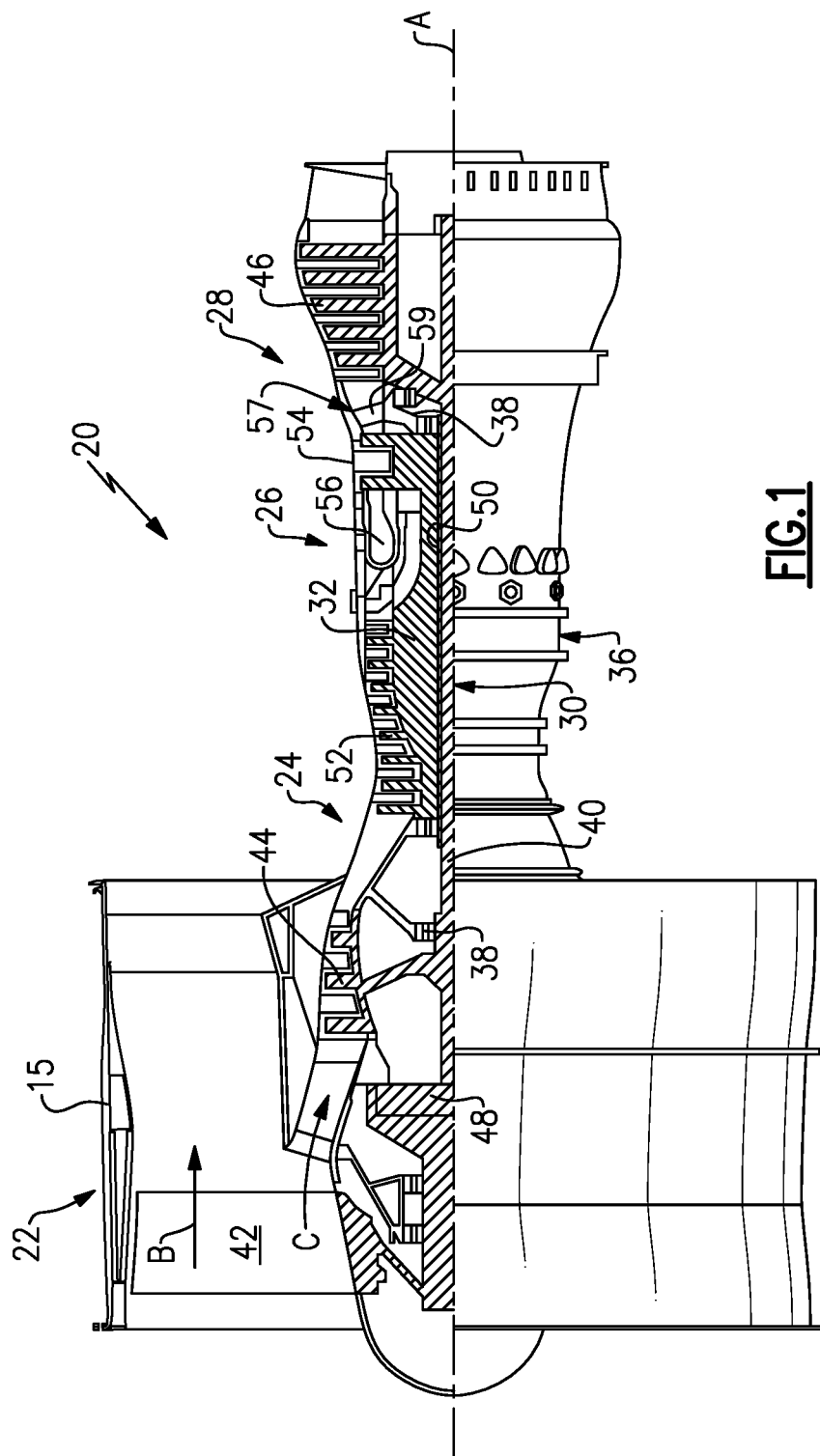
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
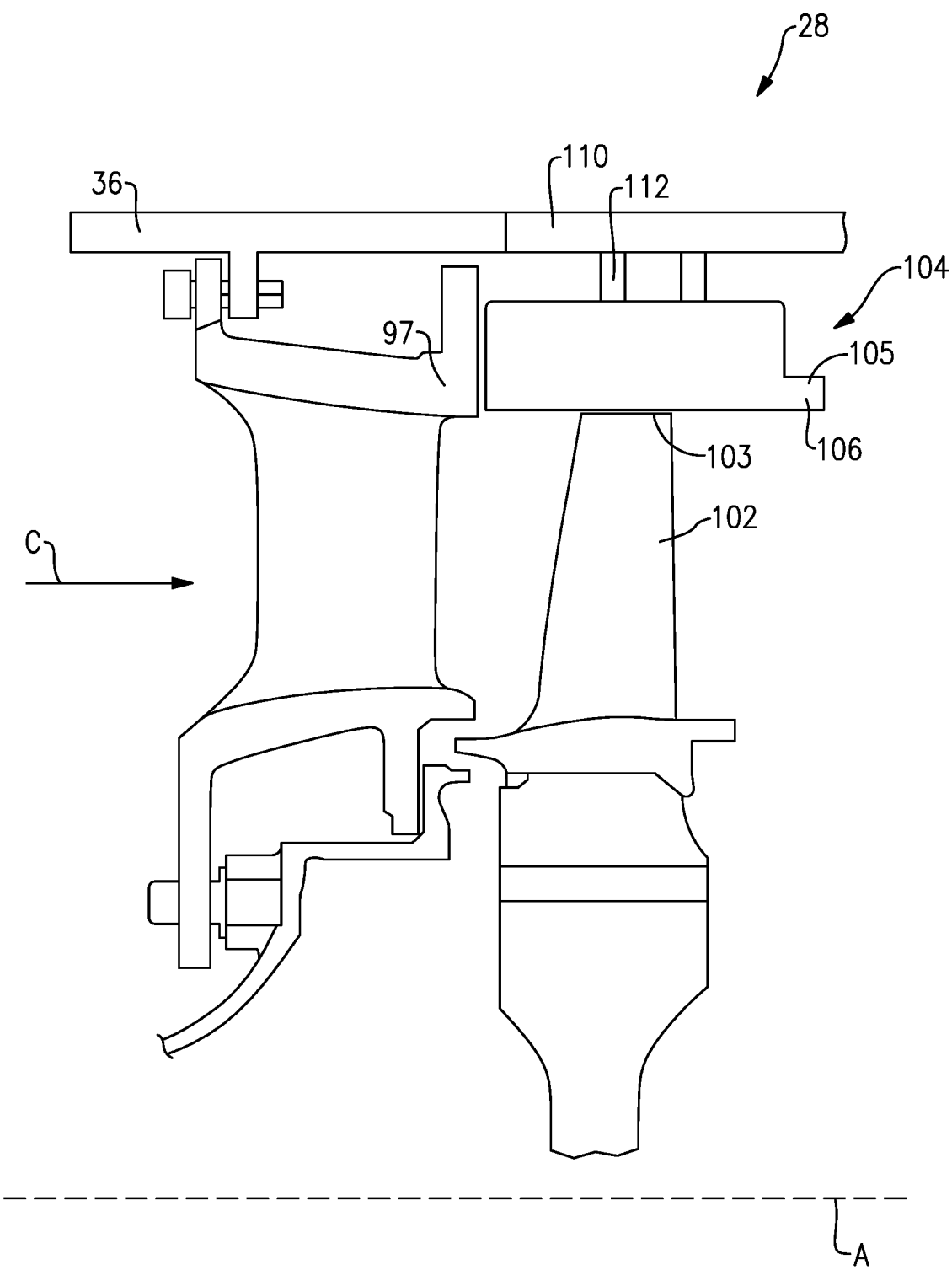
FIG. 2 shows an example turbine section.

FIG. 2 shows a portion of an example turbine section 28, which may be incorporated into a gas turbine engine such as the one shown in FIG. 1. However, it should be understood that other sections of the gas turbine engine 20 or other gas turbine engines, and even gas turbine engines not having a fan section at all, could benefit from this disclosure. The turbine section 28 includes a plurality of alternating turbine blades 102 and turbine vanes 97.

A turbine blade 102 has a radially outer tip 103 that is spaced from a blade outer air seal assembly 104 with a blade outer air seal ("BOAS") 106. The BOAS 106 may be made up of a plurality of seal segments 105 that are circumferentially arranged in an annulus about the central axis A of the engine 20. The BOAS segments 105 may be monolithic bodies that are formed of a high thermal-resistance, low-toughness material, such as a ceramic matrix composite ("CMC").

The BOAS 106 may be mounted to an engine case or structure, such as engine static structure 36 via a control ring or support structure 110 and a carrier 112. The engine structure 36 may extend for a full 360° about the engine axis A. The engine structure 36 may support the support structure 110 via a hook or other attachment means. The engine case or support structure holds the BOAS 106 radially outward of the turbine blades 102. Although a BOAS 106 is described, this disclosure may apply to other components, such as a combustor, inlet, exhaust nozzle, transition duct, or turbine vane, for example.

Figure 3:
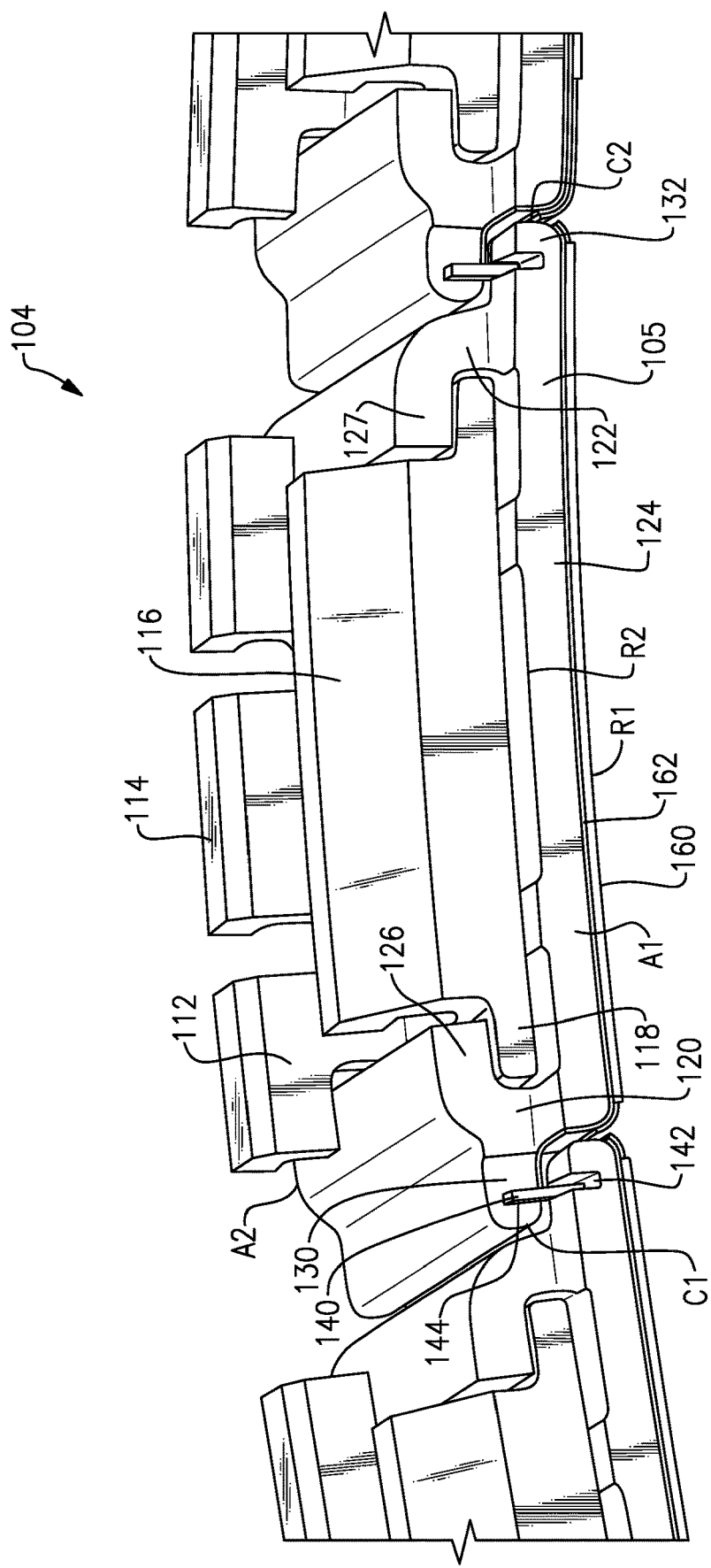
FIG. 3 shows a portion of an exemplary blade outer air seal assembly.

FIG. 3 shows a portion of an example BOAS assembly 104. The assembly 104 includes seal segments 105 mounted on a carrier 112. Each seal segment 105 is a body that defines radially inner and outer sides R1, R2, respectively, first and second axial sides A1, A2, respectively, and first and second circumferential sides C1, C2, respectively. The radially inner side R1 faces in a direction toward the engine central axis A. The radially inner side R1 is thus the gas path side of the seal segment 105 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

In the illustrated example, each BOAS segment 105 includes a first wall 120 and a second wall 122 that extend radially outward from a base portion 124. The first and second walls 120, 122 extend along the base portion 124 in a generally axial direction, and are circumferentially spaced from one another. The base portion 124 extends between the first and second axial sides A1, A2 and defines a gas path on a radially inner side and a non-gas path on a radially outer side. In this disclosure, forward, aft, upstream, downstream, axial, radial, or circumferential is in relation to the engine axis A unless stated otherwise. The base portion 124 may extend axially forward and/or aft of the first and second walls 120, 122 to provide a surface for sealing of the BOAS first and second axial sides A1, A2. That is, the walls 120, 122 may extend less than the full length of the seal segment 105 in the axial direction.

The walls 120, 122 include hooks 126, 127, respectively at a radially outermost portion. The hooks 126, 127 extend circumferentially inward towards one another. The hooks 126, 127 are configured to secure the seal segment 105 to the carrier 112. The hooks 126, 127 extend towards the matefaces, or first and second circumferential sides C1, C2.

The carrier 112 has a platform 118 with axially extending hooks 114, 116. The hooks 114, 116 extend radially outward from the platform 118 for attaching the carrier 112 and seal segment 105 to the support structure 110. A portion of the platform 118 engages with the hooks 126, 127. The platform 118 is generally parallel to the base portion 124 of the seal segment 105. In the illustrated example, the hooks 126, 127 extend in a direction perpendicular to the walls 120, 122. In other examples, the hooks 126, 127 may extend at an angle relative to the walls 120, 122. The axially extending hooks 126, 127 provide engagement with the carrier 112 along all or most of the axial length of the carrier 112. The carrier hooks 114, 116 extend generally perpendicular to the seal segment hooks 126, 127. That is, the carrier hooks 114, 116 extend generally circumferentially, while the seal segment hooks 126, 127 extend generally axially.

The first and second circumferential sides C1, C2 are configured to mate with adjacent seal segments 105. In the illustrated example, the first circumferential side C1 of each seal segment 105 has a protrusion 130 extending circumferentially outward from the seal segment 105. The second circumferential side C2 of each seal segment 105 has a second protrusion 132 extending circumferentially outward from the seal segment 105. The protrusions 130, 132 have different positions in the radial direction from one another. The protrusion 130 of a seal segment 105 is configured to engage with the second protrusion 132 of an adjacent seal segment. The protrusions 130, 132 may extend along an axial length of the first and second walls 120, 122. The protrusions 130, 132 provide sealing between the first and second circumferential sides C1, C2 of each seal segment 105.

The BOAS 106 may be formed of a ceramic matrix composite ("CMC") material. Each seal segment 105 is formed of a plurality of CMC laminates. The laminates may be silicon carbide fibers, formed into a braided or woven fabric in each layer. In other examples, the BOAS 106 may be made of a monolithic ceramic.

CMC components such as BOAS segments 105 are formed by laying fiber material, such as laminate sheets or braids, in tooling, injecting a gaseous infiltrant into the tooling, and reacting to form a solid composite component. The component may be further densified by adding additional material to coat the laminates.

In an embodiment, the BOAS segment 105 is formed from fiber material such as silicon carbide (SiC). In one example, the protrusions 130, 132 are integrally formed from the construction. The protrusions 130, 132 may be formed by wrapping braided plies about a mandrel, then pressing the laminates in the axial direction to form the protrusions 130, 132 in one example. In another example, the protrusions 130, 132 may be ply dropped into preforms using inner and outer molds that form the protrusions 130, 132.

In some examples, the radially inner side R1 may have a coating 160. In the illustrated example, the BOAS segment 105 has an environmental barrier coating (EBC) 162 in addition to an abradable coating 160. In other examples, the BOAS segment 105 may have one of the coatings 160, 162. The BOAS segment 105 may have no coating, or a different coating, in some examples.

A slot 142 is formed in the protrusion 132. The slot 142 extends radially inward towards the first radial side R1. A slot 144 is formed in the protrusion 130. The slot 144 extends radially outward. The slots 142, 144 are substantially aligned with one another when two seal segments 105 are arranged adjacent one another. The slots 142, 144 may extend less than the entire radial height of the protrusions 132, 130. The slots 142, 144 extend most of an axial length of the protrusions 132, 130. For example, the slots 142, 144 may extend at least about 80% of the axial length of the protrusions 132, 130. The slots 142, 144 may extend less than about 95% of the axial length of the protrusions 132, 130, and ending at a wall near the second axial side A2. The wall near the second axial side A2 may help prevent axial leakage.

An intersegment seal is arranged in the slots 142, 144. The intersegment seal may be a feather seal 140, for example. The feather seal 140 extends in a generally radial direction. The feather seal 140 may have a length in the axial direction between about 1.5 and 2.5 inches (38.1-63.5 mm). In a further embodiment, the feather seal 140 may have a length in the axial direction of about 2 inches (50.8 mm). The feather seal 140 provides a seal between first and second circumferential sides C1, C2 of adjacent BOAS segments 105.

The feather seal 140 may be a metallic material or ceramic material. The feather seal 140 may be a cobalt-based alloy, for example. In another example, the feather seal 140 may be formed from CMC laminates, such as a woven architecture. The slots 142, 144 may be machined into the BOAS segments 105. The slots 142, 144 may be machined via ultrasonic machining or conventional grinding, for example. The slots 142, 144 provide forward line of sight access for the feather seal 140 to be inserted in the axial direction.

Figure 4:
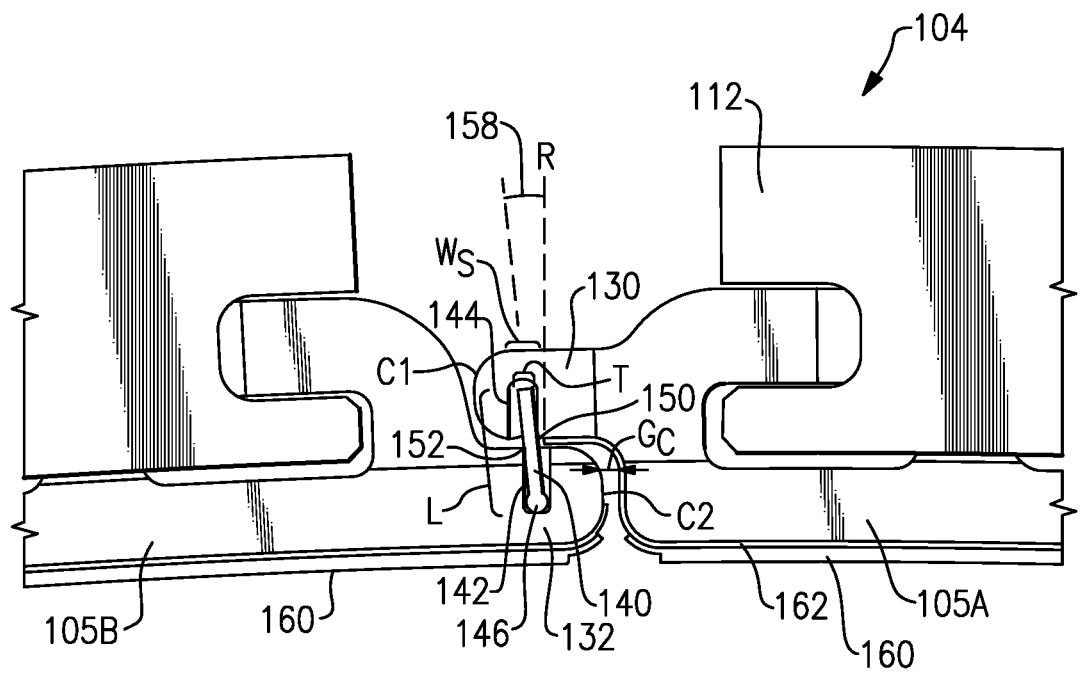
FIG. 4 shows a portion of the exemplary blade outer air seal assembly in a cold assembly state.

FIG. 4 is a portion of the BOAS assembly 104 in a cold assembly state. In the cold assembly state, the slots 142, 144 are circumferentially offset. A gap $G_C$ is formed between two adjacent seal segments 105A, 105B. The feather seal 140 and slot 142, 144 arrangement permits this gap to change as the temperature of the assembly 104 changes during engine operation.

The slots have a width $W_S$ that is greater than a thickness T of the feather seal 140. The thickness T may be between about 0.01 and 0.03 inches (0.254-0.762 mm). In a further embodiment, the thickness T may be about 0.02 inches (0.508 mm). The slot width $W_S$ may be about 1.5-2.5 times the thickness T. The feather seal 140 has a length L that extends generally in the radial direction. The length L is slightly less than a radial length of the two slots 142, 144, combined. The length L may be between about 0.25 and 0.35 inches (6.35-8.89 mm), for example. In a further example, the length L may be about 0.3 inches (7.62 mm). In the cold assembly state, the feather seal 140 contacts the slot 144 at a point 150 and contacts the slot 144 at a point 152. The point 150 is near a radially innermost portion of the protrusion 130 and the point 152 is near a radially outermost portion of the protrusion 132.

The feather seal 140 may have a bull-nosed end 146. The end 146 has a larger width than the thickness T, in some examples. The feather seal 140 is configured to rotate about the end 146. In this example, the feather seal 140 is arranged at an angle 158 with respect to the radial direction R. The angle 158 may be about 10° or less. In the illustrated example, the bull-nosed end 146 is at the radially inner end of the feather seal 140. In other examples, the bull-nosed end 146 may be at the radially outer end of the feather seal 140, or the feather seal 140 may rotate about an end that does not have a bull-nosed portion.

Figure 5:
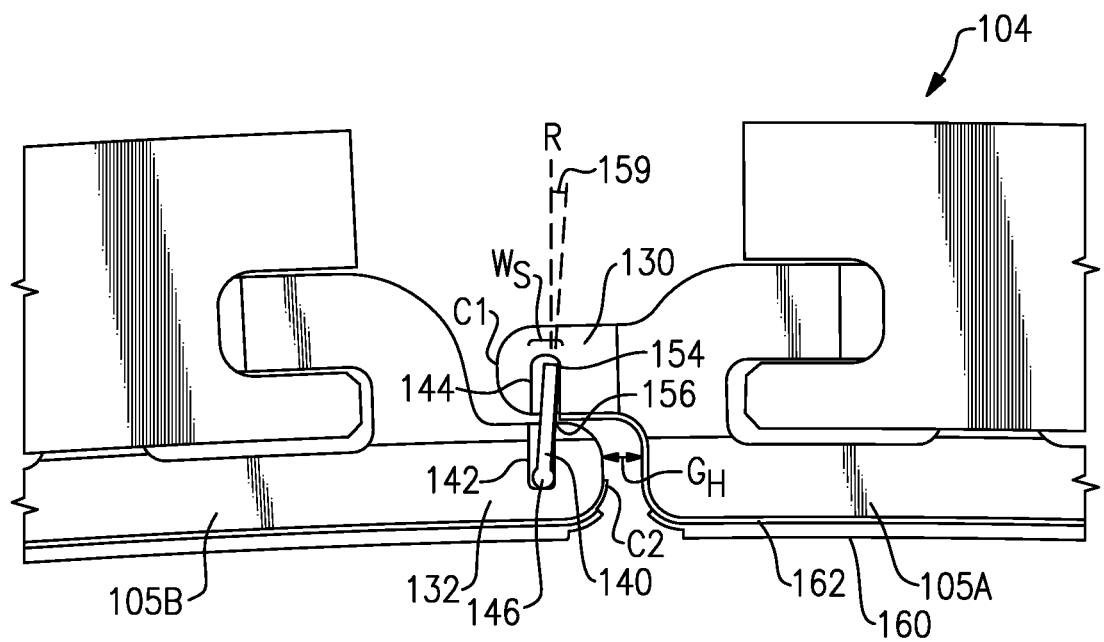
FIG. 5 shows a portion of the exemplary blade outer air seal assembly in a hot operation state.

FIG. 5 is a portion of the BOAS assembly 104 in a hot operation state. In a hot operation state, the gap $G_H$ between adjacent seal segments 105A, 105B may be larger than the gap $G_C$ in the cold state. In a hot operation state, the gap $G_H$ between adjacent seal segments 105A, 105B may likewise be transiently smaller than the gap $G_C$ in the cold state. The gap $G_H$ may grow to between about 0 and about 0.040 inches (0.254-1.016 mm), for example. The larger gap $G_H$ shifts the slots 142, 144 with respect to one another. The radial feather seal 140 rotates about the end 146 to remain in the slots 142, 144. In the hot state, the intersegment seal 150 contacts the seal segments at points 154, 156. In one example, the point 154 is near a radially outer portion of the slot 144 and the point 156 is at a radially outer portion of the slot 142. In this position, the feather seal 140 is arranged at a second angle 159 relative to the radial direction R. In some examples, the second angle 159 is smaller than the angle 158.

The disclosed radially extending slots and feather seal accommodate large mateface gap excursions from thermal growth mismatch within the BOAS assembly. This may be particularly helpful for CMC BOAS segments mounted to a metallic segmented carrier or full ring case. The feather seal slots are arranged away from highly stressed ply regions within the seal segment hooks. The featherseal itself is shielded from direct line of sight exposure to hot turbine flowpath gases. The design provides robust mateface sealing with the feather seal and with the shiplap protrusions on the circumferential sides of each seal segment. This arrangement may also permit a smaller feather seal than known circumferentially extending feather seals, which typically must be large enough to accommodate the changing gap between seal segments 105.

In this disclosure, "generally axially" means a direction having a vector component in the axial direction that is greater than a vector component in the circumferential direction, "generally radially" means a direction having a vector component in the radial direction that is greater than a vector component in the axial direction and "generally circumferentially" means a direction having a vector component in the circumferential direction that is greater than a vector component in the axial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A blade outer air seal assembly, comprising:
a support structure;
a blade outer air seal having a plurality of segments extending circumferentially about an axis and mounted in the support structure, at least two segments of the plurality of segments having a base portion extending from a first circumferential side to a second circumferential side, a first protrusion extending from the first circumferential side and having a first radially extending slot and a second protrusion extending from the second circumferential side and having a second radially extending slot, wherein the base portion extends from a first axial side of the at least two segments of the plurality of segments to a second axial side of the at least two segments of the plurality of segments to define a segment axial length; and
a feather seal arranged in the first radially extending slot and the second radially extending slot between the at least two segments, the feather seal extends in an axial direction for most of the seal segment axial length, wherein the feather seal has a thickness and a rounded end having a greater thickness at a radially inner end, the greater thickness is larger than a thickness at a radially outer end.

2. The blade outer air seal assembly of claim 1, wherein at least one segment of the at least two segments has at least one hook extending radially outward from the base portion, wherein the first and second radially extending slots are circumferentially outward of the at least one hook.

3. The blade outer air seal assembly of claim 1, wherein the feather seal has a thickness that is less than a circumferential width of the first and second radially extending slots.

4. The blade outer air seal assembly of claim 3, wherein a ratio of the circumferential width of the first and second radially extending slots to the thickness of the feather seal is between about 1.5 and 2.5.

5. The blade outer air seal assembly of claim 1, wherein the feather seal is configured to rotate about the rounded end.

6. The blade outer air seal assembly of claim 5, wherein the feather seal is configured to rotate less than about 10°.

7. The blade outer air seal assembly of claim 1, wherein the thickness of the feather seal is about 0.010 to 0.030 inches (0.254-0.762 mm).

8. The blade outer air seal assembly of claim 1, wherein the feather seal extends in the axial direction for at least about 80% of the segment axial length.

9. The blade outer air seal assembly of claim 1, wherein the first and second protrusions are offset in a radial direction and overlap one another in a circumferential direction.

10. The blade outer air seal assembly of claim 9, wherein a gap is arranged between each of the plurality of segments to accommodate thermal expansion, the gap is less than about 0.040 inches (0.254-1.016 mm).

11. The blade outer air seal assembly of claim 1, wherein the at least two segments are a ceramic matrix composite material.

12. The blade outer air seal assembly of claim 1, wherein the at least two segments are a monolithic ceramic material.

13. The blade outer air seal assembly of claim 1, wherein the feather seal is a ceramic matrix composite material.

14. The blade outer air seal assembly of claim 1, wherein the feather seal is a metallic material.

15. The blade outer air seal assembly of claim 1, wherein the first radially extending slot extends radially outward and the second radially extending slot extends radially inward, the first radially extending slot aligned with the second radially extending slot in the circumferential direction.

16. A gas turbine engine, comprising:
a compressor section, a combustor section, and a turbine section arranged about an axis of rotation;
an assembly having a plurality of segments arranged circumferentially about the axis of rotation, at least two segments of the plurality of segments having a base portion extending from a first circumferential side to a second circumferential side, a first protrusion extending from the first circumferential side and having a first radially extending slot circumferentially inward of a first end of the first protrusion and a second protrusion extending from the second circumferential side, having a second radially extending slot circumferentially inward of a second end of the second protrusion, wherein the base portion extends from a first axial side of the at least two segments of the plurality of segments to a second axial side of the at least two segments of the plurality of segments to define a segment axial length, wherein the at least two segments are a ceramic material; and a feather seal arranged in the first radially extending slot and the second radially extending slot between the at least two segments, the feather seal extends in an axial direction for most of the segment axial length, wherein the feather seal has a thickness and a rounded end having a greater thickness at a radially inner end, the greater thickness is larger than a thickness at a radially outer end.

17. The gas turbine engine of claim 16, wherein the feather seal is a ceramic material.

18. The gas turbine engine of claim 16, wherein the feather seal is a metallic material.

\* \* \* \* \*